(12) United States Patent
Miller et al.

(10) Patent No.: US 9,073,708 B2
(45) Date of Patent: Jul. 7, 2015

(54) SEALED PNEUMATIC CARRIER WITH SLAM-LATCH

(71) Applicant: TRANSLOGIC CORPORATION, Denver, CO (US)

(72) Inventors: Rick Miller, Loveland, CO (US); Craig Grafmiller, Castle Pines, CO (US); Edward H Davis, Denver, CO (US)

(73) Assignee: TRANSLOGIC CORPORATION, Denver, CO (US)

( * ) Notice: Subject to any disclaimer, the term of this patent is extended or adjusted under 35 U.S.C. 154(b) by 0 days.

(21) Appl. No.: 14/014,908

(22) Filed: Aug. 30, 2013

(65) Prior Publication Data

US 2014/0064861 A1   Mar. 6, 2014

Related U.S. Application Data

(60) Provisional application No. 61/694,866, filed on Aug. 30, 2012.

(51) Int. Cl.
*B65G 51/06* (2006.01)
*B65G 51/04* (2006.01)

(52) U.S. Cl.
CPC .............. *B65G 51/04* (2013.01); *B65G 51/06* (2013.01)

(58) Field of Classification Search
CPC .............................. B65G 51/04; B65G 51/06
USPC .................................................. 406/184–190
See application file for complete search history.

(56) References Cited

U.S. PATENT DOCUMENTS

| 726,022 | A | | 4/1903 | Burton |
| 3,593,948 | A | | 7/1971 | McClellan |
| 3,787,007 | A | | 1/1974 | Alexandrov et al. |
| 3,787,008 | A | | 1/1974 | Barnett et al. |
| 3,825,210 | A | | 7/1974 | Weaver |
| 4,006,868 | A | | 2/1977 | Hochrael et al. |
| 4,114,835 | A | | 9/1978 | Alexandrov et al. |
| 4,324,511 | A | | 4/1982 | Iriish |
| 4,362,443 | A | | 12/1982 | Mallory et al. |
| 4,470,730 | A | | 9/1984 | Wuthrich |
| 4,758,004 | A | * | 7/1988 | Semon .......................... 277/648 |
| 4,941,777 | A | | 7/1990 | Kieronski |
| 4,948,303 | A | | 8/1990 | Good |
| 5,092,714 | A | | 3/1992 | Porter et al. |
| 5,181,805 | A | | 1/1993 | Grosswiller et al. |
| 5,181,806 | A | | 1/1993 | Grosswiller et al. |
| 5,181,807 | A | | 1/1993 | Anders |
| 5,368,417 | A | | 11/1994 | Benjamin et al. |
| 5,518,545 | A | | 5/1996 | Miyano |
| 5,538,366 | A | | 7/1996 | Piland et al. |
| 5,562,591 | A | | 10/1996 | Marchand et al. |
| 5,573,356 | A | | 11/1996 | Henderson |

(Continued)

*Primary Examiner* — William R Harp
(74) *Attorney, Agent, or Firm* — Marsh Fischmann & Breyfogle LLP

(57) ABSTRACT

Provided herein is a pneumatic carrier having a leak resistant cargo area where first and second mating shells form the carrier. To provide a leak resistant cargo area, the one embodiment of the carrier employs a flap-type sealing member. In one embodiment, a first engagement surface about a peripheral edge of a first of the shells includes a groove into which a base portion of a sealing member is disposed. A second portion of the sealing member forms a flap that extends upward and inward from the base portion. A second engagement surface of the second shell contacts this flap and compresses the flap toward the first engagement surface when the shells are in a closed position.

17 Claims, 13 Drawing Sheets

(56) References Cited

U.S. PATENT DOCUMENTS

| | | |
|---|---|---|
| 5,636,947 A | 6/1997 | Valerino, Sr. et al. |
| 5,655,677 A | 8/1997 | Fratello et al. |
| 5,980,164 A | 11/1999 | Fratello |
| 7,241,081 B1 | 7/2007 | Keller et al. |
| 7,413,099 B2 * | 8/2008 | Takahashi et al. ............ 220/806 |

* cited by examiner

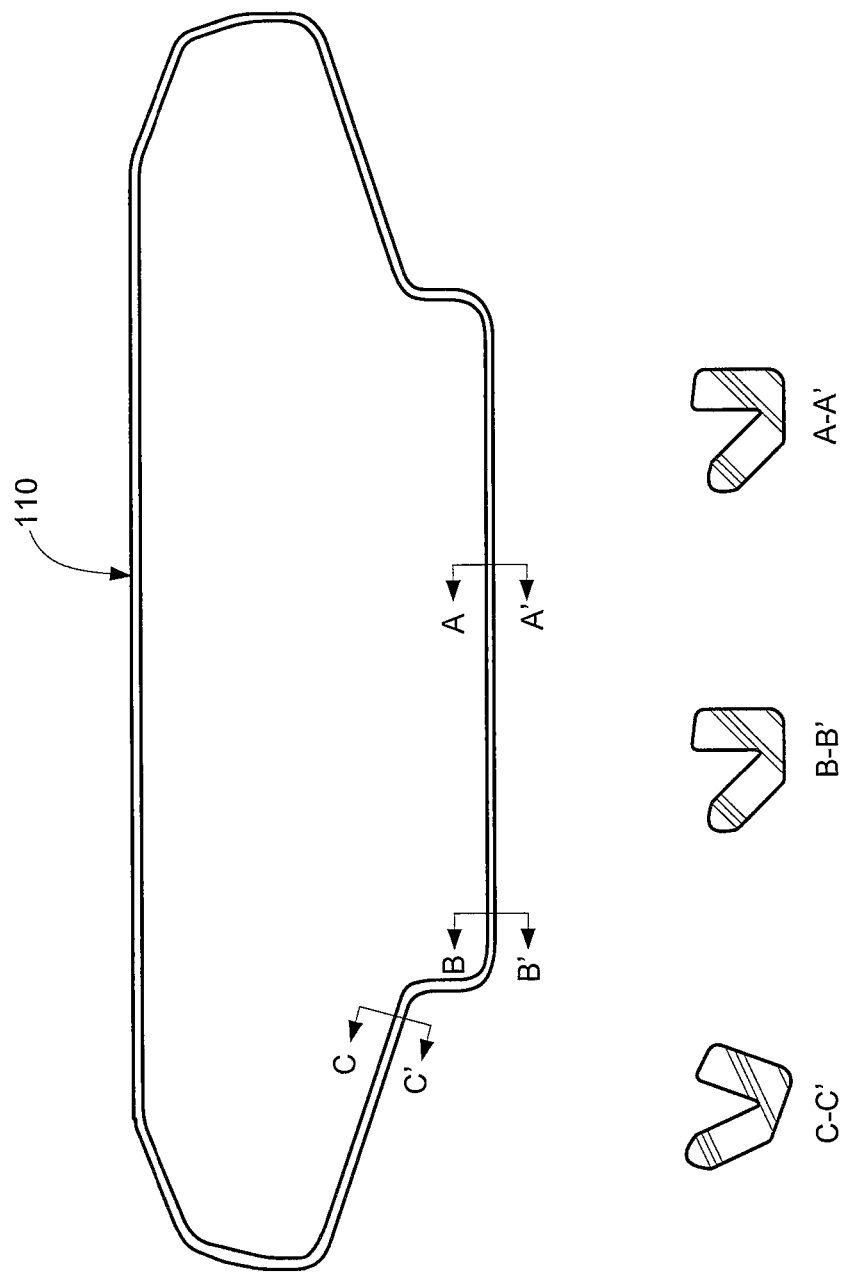

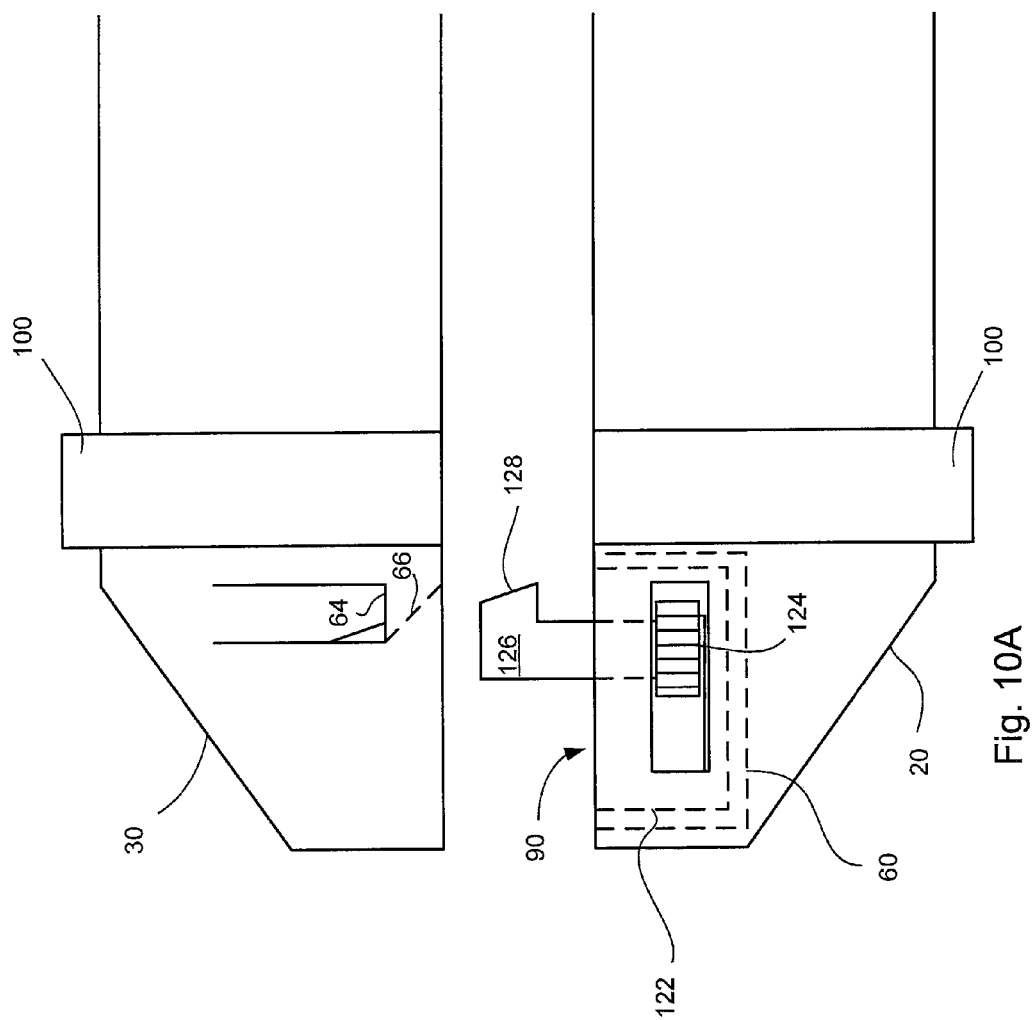

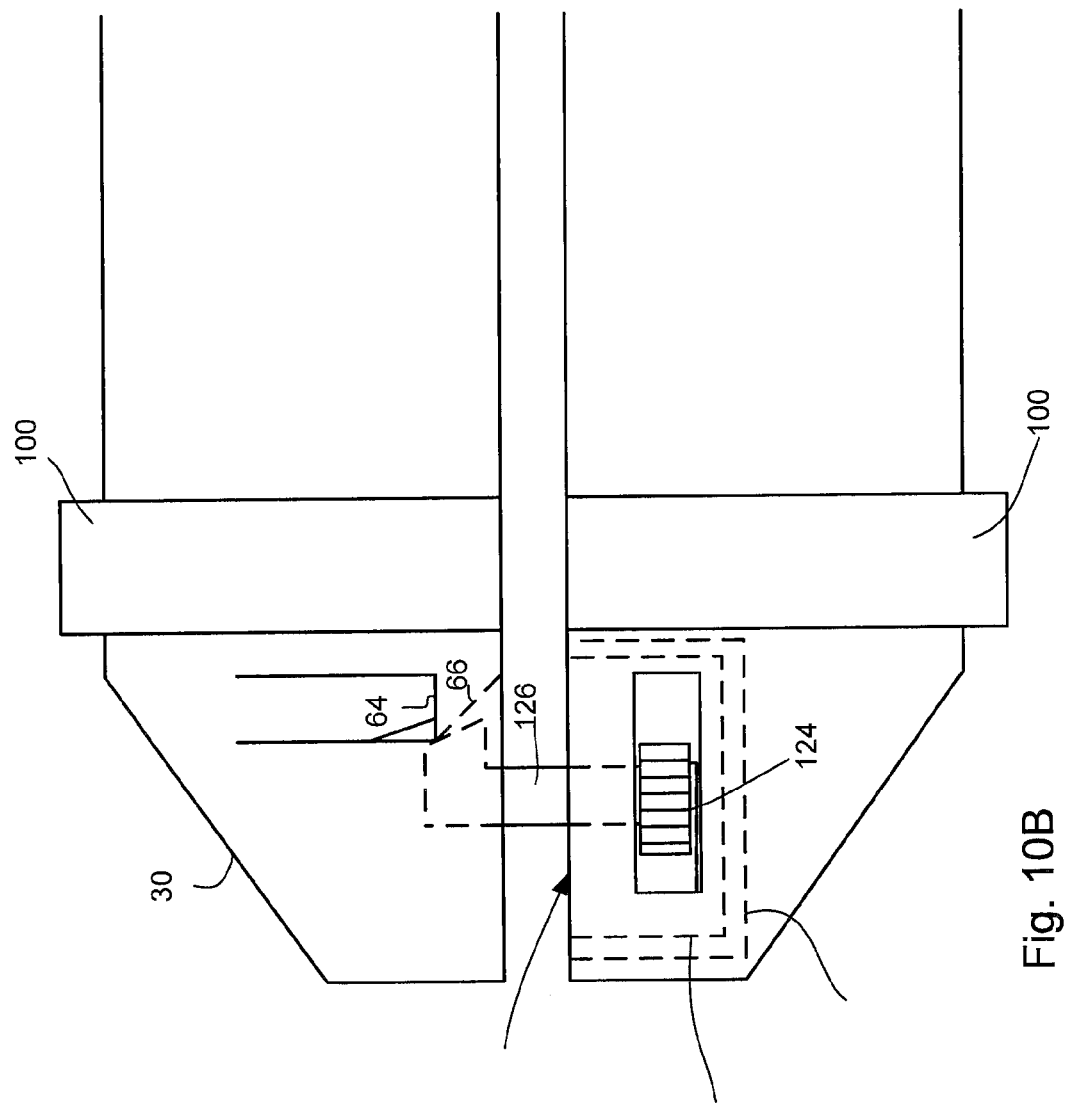

SEALED PNEUMATIC CARRIER WITH SLAM-LATCH

CROSS REFERENCE

This application claims the benefit of the filing date of U.S. Provisional Application No. 61/694,866 having a filing date of Aug. 30, 2012, the entire contents of which is incorporated herein by reference.

FIELD

The present disclosure relates to carrier vessels for use with pneumatic tube transport systems. More particularly, aspects of the present disclosure relate to a two-part carrier vessel having single stage to close latch and seal arrangement that provides a substantially leak-proof connection between contacting surfaces of the carrier vessel when the vessel is closed.

BACKGROUND

Many buildings or structures include pneumatic tube transport systems for transporting objects, such as products, components, documents, drawings or other materials from one location in the building to another. Pneumatic tube transport systems typically comprise a number of substantially hermetically sealed tubes extending between locations in a building and a mechanism for selectively evacuating air from, or forcing air into, the tubes. In use, objects are placed in a carrier vessel, typically a substantially cylindrical housing, which is placed into the pneumatic tube transport system. The vessel is then propelled through the tube by creating a zone of relatively higher pressure on one side of the carrier vessel than on the other. This may be accomplished by creating a zone of negative pressure (e.g. a vacuum) in front of the vessel or by creating a zone of positive pressure behind the vessel.

In certain settings, objects housing fluids need to be transported using the pneumatic tube transport system. For example, in the health care setting pneumatic tube transport systems are well adapted for transporting fluids such as laboratory samples, blood samples or other body fluids, or intravenous bags between areas of the building. When using pneumatic tube transport systems in such health care applications, it is desirable that the carrier vessels be suitable for transporting fluids. More particularly, it is desirable that the carrier vessels, upon closure, seal to provide substantially leak-resistant containment of fluids, which may unwontedly spill from their primary containers into the vessel. Fluids which spill from their primary containers inside the vessel may leak from the vessel into the pneumatic tube posing a health risk and resulting in a risk that the pneumatic tubes may not properly function due to the presence of fluid in the system.

Various attempts have been made to produce leak-proof or sealing pneumatic carriers. However, such carriers have suffered from various drawbacks. For instance, many prior sealing carriers have utilized a flat gasket or O-ring that forms a seal, upon compression between mating surfaces of the opposing shells of the pneumatic carrier. However, such gaskets or O-rings typically require a significant compressive force to achieve a leak-proof seal (i.e., energize the seal).

To achieve compressive forces to effectively energize the seal, prior carriers have typically utilized multi-stage latches. Such latches typically require a user to close the carrier, hook the latch, and subsequently engage the latch to further compress the gasket or O-ring. That is, the act of closing the carrier does not, by itself, form a seal. The user must 1) close the carrier and 2) latch the carrier using, for example, three-bar latch arrangements and/or sliding cam latch arrangements that provide the mechanical force multiplication necessary to energize the seal.

SUMMARY

The present inventors have recognized that prior art sealing carriers often provide an ineffective seal. One specific area of seal failure is user operation. That is, users often fail to fully engage the latch after closing the carrier. Stated otherwise, users are often distracted or in a hurry and fail to perform or fully perform the second stage latching (e.g., compression step) required to form an effective seal.

Accordingly, provided herein are various carrier sealing arrangements that allow for generating an effective seal in the presence of reduced compressive forces using a wedge or flap type seal disposed on a first carrier shell that mates with a flat sealing on a second carrier shell.

To accomplish the aforementioned and other objectives, one aspect of the presented inventions is directed to a carrier that employs a flap-type seal arrangement. The carrier includes first and second shell members having mating engagement surfaces. The carriers are hingedly connected to permit movement between an open position and a closed position. A sealing periphery extends about a portion or all of the engagement surface of each respective shell. A sealing element is disposed on one of the sealing peripheries/engagement surfaces. When the first and second shell members are joined together to form a carrier vessel, the seal element provides a substantially fluid-tight seal between the first and second shell members. The engagement surface that includes the sealing element supports a base portion of the sealing element, which is fixedly attached to the engagement surface. A second portion of the sealing element forms a flap (e.g., viewed in cross-sectional profile) having an elongated body that extends upwardly and away from the base portion. The base portion and the elongated flap may be attached or integrally formed. A free end of the flap portion protrudes above that engagement surface and extends about the sealing periphery of the engagement surface. That is, the flap is cantilevered above the first engagement surface. Upon closing, the engagement surface of the other shell contacts this cantilevered flap and compresses it toward the first engagement surface. Generally, the flap portion of the sealing element extends a height above the first engagement surface is greater than a maximum distance between the engagement surfaces when those surfaces are juxtaposed (e.g., when the shells are in a closed position).

When the first and second shell members are engaged to form a closed carrier vessel, the flap portion of the element is compressed from a first orientation relative to the first engagement surface to a second orientation relative to the first engagement surface (e.g., where the second orientation is different the first orientation) to establish a leak-resistant seal between the first and second shell members. The carrier vessel thus provides leak-resistant containment of fluids which may spill from their primary containers into the carrier vessel. The use of the flap-type sealing element on a first engagement surface of a first carrier shell in conjunction with a substantially planar second engagement surface of a second carrier shell accounts for variations in vertical and horizontal offsets between the engagement surfaces about their peripheries.

In one arrangement, the base portion of the seal element is adapted for disposition within a groove formed into the first engagement surface. In another arrangement, the base portion is attached (e.g., adhered) directly to the first engagement surface.

The sealing element may be formed of any material that provides desired compression and/or non-permeability. Such materials include, without limitations, elastomateric materials, natural rubbers, foams etc. In any arrangement, it may be desirable that the seal element has a hardness that allows for creating a seal upon compression. In one arrangement, the sealing element has a durometer hardness between about 35 Shore A and about 50 Shore D. In various arrangements, a soft sealing element may be disposed within a more durable casing. By way of example only, a porous foam sealing element may be cased in a thin layer of plastic to provide non-porosity and/or a more durable surface. In the latter regard, a thin coating may be applied to improve wear characteristics of the sealing element.

According to another arrangement, a single-stage to close sealing carrier is provided. In this arrangement, the act of closing the carrier energizes the flap-type seal between first and second shell members. That is, no secondary compression force is required to further compress the seal after initial closure. The latch interconnects the first and second shells in a closed position. The latch includes a biased pawl member that is attached to one of the first and second shells and a detent formed in the other of the first and second shells. The detent receives the pawl as the shells move from the open position to the closed position. Upon the detent receiving the pawl, the carrier is closed and the seal element is energized to form a fluid-tight seal around the peripheries of the engagement surfaces.

The latch may be any mechanism that allows for attaching the first and second shells in conjunction with movement from a first position to a second position where no secondary user engagement is required. In one arrangement, the biased pawl member includes a sliding element and a spring. In this arrangement, the sliding element may compress the spring as the sliding element retracts from the first position to the second position. For instance, a tip of the sliding element may engage a ramped surface (or other angled surface) associated with the detent. That is, the sliding element may automatically retract until it reaches the top of such a ramped surface at which time it may be biased into the detent by the spring.

Additional advantages of the present invention will become readily apparent from the following discussion, particularly when taken together with the accompanying drawings.

BRIEF DESCRIPTION OF THE DRAWINGS

FIG. 4 illustrates one embodiment of a seal element that may be attached to an engagement surface of a carrier shell.

FIGS. 10A-10C are enlarged cross-sectional views a latching mechanism, before, during and after closing the first and second shell members of the carrier vessel.

DETAILED DESCRIPTION

Reference will now be made to the accompanying drawings, which assist in illustrating the various pertinent features of the present disclosure. Although the present disclosure is described primarily in conjunction with a side-opening carrier for use in a pneumatic tube transport system, it should be expressly understood that aspects of the present invention may be applicable to other carrier configuration including, without limitation, end-opening carriers. In this regard, the following description is presented for purposes of illustration and description.

Figure 1:
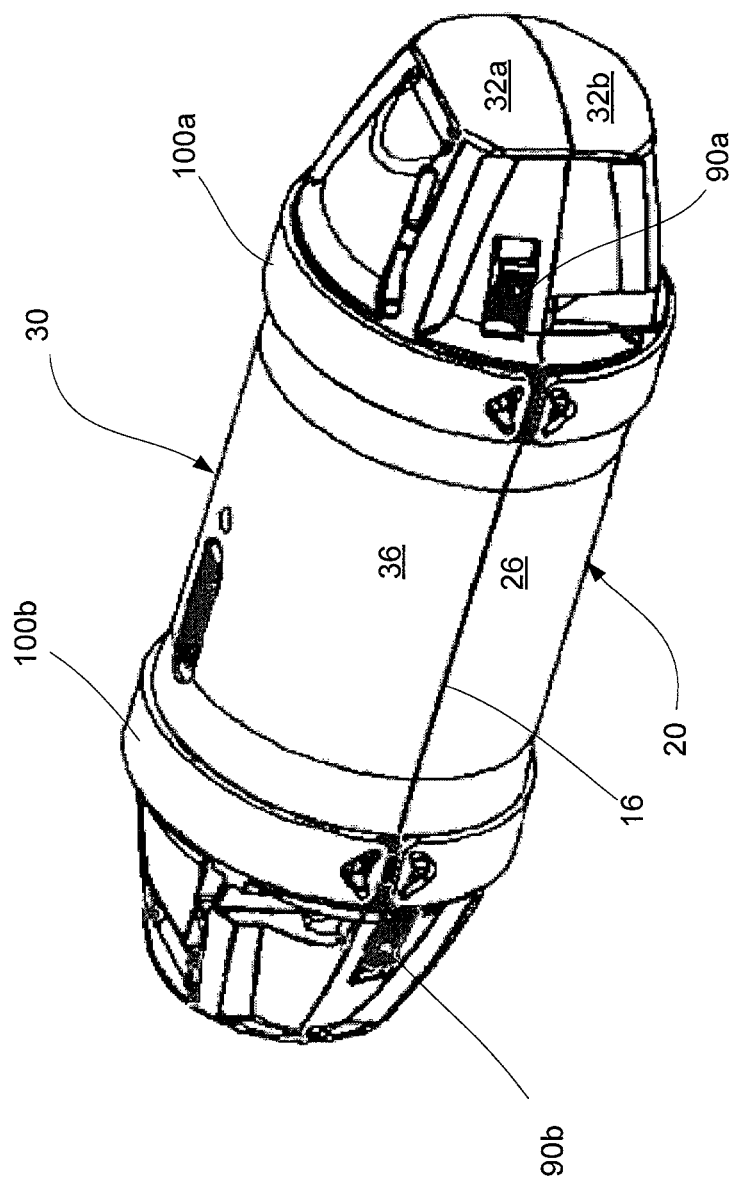
FIG. 1 is a perspective view of one embodiment of a carrier vessel when closed.
Figure 2:
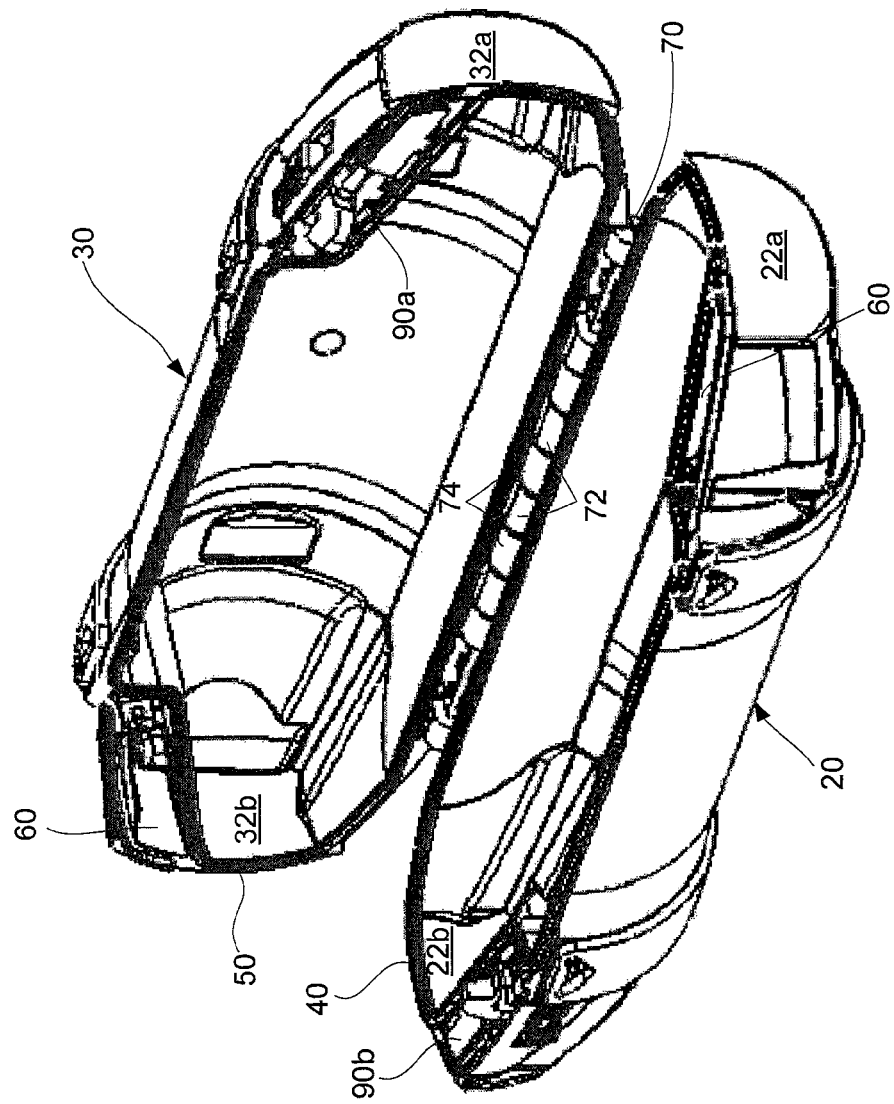
FIG. 2 shows a perspective view of one embodiment of a carrier vessel when opened.

FIGS. 1 and 2 illustrate one embodiment of a carrier 10, which may be used to house objects being transported in a pneumatic tube transport system. The carrier 10 includes a first shell member 20 and a second shell member 30 engageable along opposing engagement surfaces that at least partially define an interface 16 when the shell members are engaged to form a substantially cylindrical carrier vessel. Advantageously, when the first shell 20 and second shell 30 are secured, a substantially fluid-tight seal is formed between the two shell members to inhibit the passage of fluids into or out of the carrier 10. Accordingly, the carrier 10 may be used to transport containers that include fluids in a pneumatic tube transport system, with reduced concern of these fluids spilling.

The first shell member 20 includes first and second end walls 22a, 22b. A semi-cylindrical housing wall 26 extends between the first and second end walls 22a, 22b. The edges of the end walls 22a, 22b and housing wall 26 define a first engagement surface 40, which extends substantially in a single plane about a periphery of the first shell member 20. Second shell member 30 is similar in shape to the first shell member 20 and includes first and second end walls 32a, 32b and a semi-cylindrical housing wall 36. The edges of the end walls 32a, 32b and housing wall 36 define a second engagement surface 50 which extends substantially in a single plane about a periphery of the second shell member 30. Shell members 20, 30 are in one embodiment formed from a translucent, rigid plastic material, however it will be appreciated that numerous other materials, including opaque materials, metals or carbon composite materials, could be used.

When the first and second engagement surfaces 40, 50 are juxtaposed (i.e., the carrier is closed) the carrier defines a generally cylindrical vessel having an enclosed interior. In the present embodiment, first and second ends of the carrier are tapered or frustoconical. However, it will be appreciated that other embodiments may utilize different configurations.

A hinge assembly 70 joins the first and second shell members 20, 30 together to permit pivotal movement therebetween. The hinge assembly 70 includes first and second sets of ferrules 72, 74 that are attached along a lateral edge of the first and second shells 20, 30. Each set of ferrules are spaced longitudinally along their respective housing wall 26 or 36 for alternating engagement with the ferrules on the opposing shell. In the present embodiment, these ferrules are an integral part of the shell members 20, 30. It will be appreciated that more ferrules could be used or that such ferrules could be formed separately and secured to shell members 20, 30 using conventional fasteners. A hinge pin disposed through the inside of the ferrules 72, 74 to ensure that the shell members 20, 30 are aligned and allow movement between an open position and a closed position. The carrier 10 also includes wear bands 100 for positioning the carrier within tubes of the pneumatic tube system and for creating a seal across the carrier when positioned within such tubes. As illustrated in FIG. 1 identical first and second sets of wear bands 100a, 100b are attached to the first shell member 20 and the second shell member 30.

As illustrated in FIG. 2 first and second engagement surfaces 40, 50 extend generally around the periphery of the first and second shells 20, 30, respectively. However, in the present embodiment, the latching assemblies as well as the hinge assembly 70 are disposed outside of the periphery defined by these engagement surfaces 40, 50. That is, the peripheries of the engagement surfaces do not match the outside peripheries of the shells. Rather the engagement surfaces are disposed in-board of the latch assemblies 90a, 90b and the hinge assembly 70. As will be appreciated, this eliminates the need to seal around these assemblies. Stated otherwise, the periphery of the sealed enclosure defined by the engagement surfaces is free of intrusion by the hinge assembly 70 and/or the latch assemblies 90. However, it will be appreciated that, in other embodiments, one or more of these assemblies may be disposed within the periphery of the seal element. For instance, U.S. Pat. No. 5,655,677 to Fratello discloses an arrangement where the hinge assembly may be disposed within the perimeter of a sealing surface.

Figure 3:
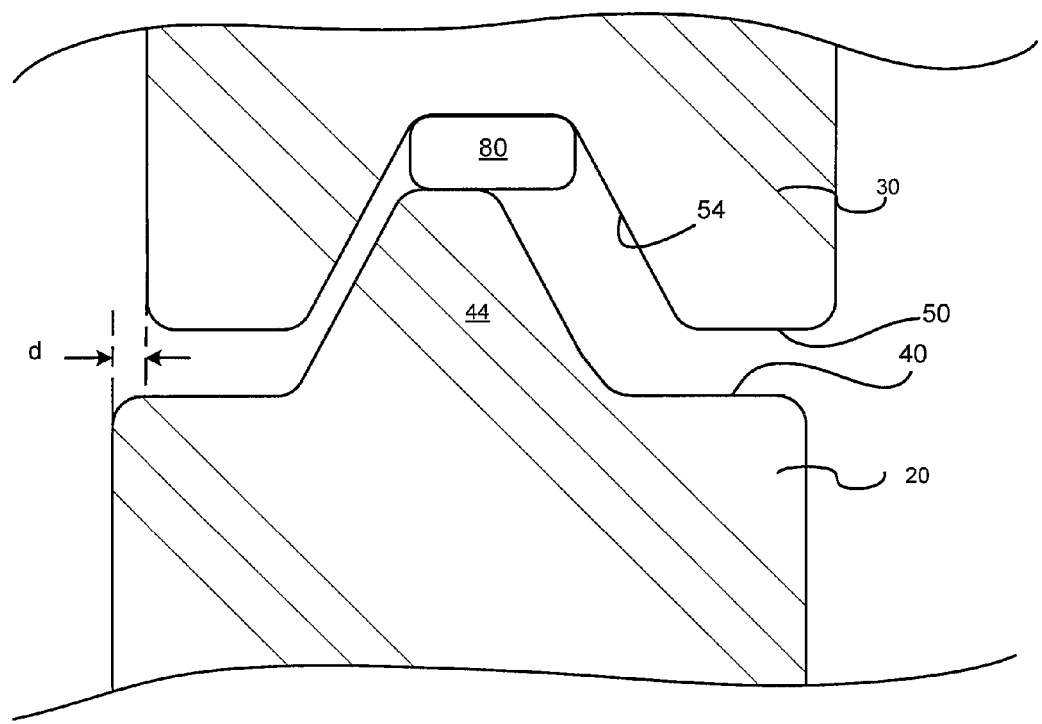
FIG. 3 is an enlarged cross-sectional view of a prior method for forming a seal between engagement surfaces of a pneumatic carrier.

FIG. 3 illustrates a cross-sectional view of the engagement surfaces 40, 50 of first and second shell members 20, 30, respectively, of a prior art carrier that provides a seal between the engagement surfaces. As shown in FIG. 3, the first engagement surface 40 includes a protruding tongue member 44 that is disposed around its periphery and the second engagement surface 50 includes a groove 54 that is disposed about its periphery. A seal element or gasket 80 is disposed within the recessed groove 54 about the periphery of the second engagement surface 50. When the first and second shells 20, 30, the tip of the tongue member 44 contacts and compresses the gasket 80.

While effective in theory, the sealing system of FIG. 3 has numerous drawbacks. Specifically, the present inventors have recognized that the first and second shells 20, 30 are often not perfectly matched. That is, the shells 20, 30 do not necessarily form perfectly flat and level sealing surfaces. Generally, constructed of plastic materials, the shells are subject to manufacturing tolerances and variations inherent in injection molding and other manufacturing processes. Stated otherwise, the shell 20, 30 are not perfectly symmetric and can be slightly warped and/or offset (e.g., offset 'd' as shown in FIG. 3). Such warping and/or offset can result in less than optimal contact between the tongue member 44 and the gasket 80, which may result in leakage. In addition, the latches and hinges that are utilized to close the first and second shells, 20, 30 are usually positioned irregularly around the perimeter of the carrier resulting in uneven force application around the peripheries of the engagement surfaces. Typically, this results in the seal located near the latch being over compressed and areas removed from the latch or hinge being under compressed. This is particularly problematic when low modulus materials (such as polycarbonates) are utilized to manufacture pneumatic tube carriers. The physical material lacks sufficient stiffness to provide the beam rigidity necessary to compress the seals without creating excessively thick carrier shells or applying high compressive forces. Furthermore, as the carrier moves through a pneumatic tube system, the body defined by the first and second shells 20, 30 may become stressed, resulting in some deflection of one or both shells, which may allow for reducing compression on one or more portions of the sealing element which can result in leakage. All of these factors result in the need to apply high compressive forces to the gasket 80 to effect a seal. This results in a carrier that is difficult to close and which often provides poor sealing.

Provided herein is a pneumatic carrier sealing system and method that generates and effective seal between mating carrier shells while accounting for variations in the tolerances of the mating engagement surfaces of carrier shells and varying closure force applied about the peripheries of the engagement surfaces. Further, the sealing system and method provides an effective seal without requiring high compressive forces that can make it difficult for users to close the mating shells of a carrier. The ability to create an effective seal without application of high compressive forces between the engagement surfaces of the carrier shells is aided in the presented embodiments by the use of a deflectable flap incorporated into the sealing element. Once the sealing element is attached about a periphery of one of the carrier shell engagement surfaces, the deflectable flap is typically cantilevered above and engagement surface. In this regard, rather than having to compress into the body of the sealing element to create a seal, all that is required is to deflect the flap. This reduces the force required to generate the seal. Further, different areas around the periphery of the seal may be compressed to greater or lesser extents to account for variations in the planarity (e.g., warping) of the engagement surfaces. Further, such a seal also accounts for offsets between engagement surfaces as is more fully discussed below.

FIG. 4 illustrates one embodiment of a seal element 110 that is adapted to be disposed about a periphery of an engagement surfaces 40, 50 of one of the carrier shells 20, 30. See FIG. 2. This seal element 110 is shaped to match the periphery of the engagement surface to which it is attached and thus provide a continuous seal around that periphery. The sealing element 110 may be formed from any number of conventional sealing materials, including, without limitation, rubber or synthetic polymers and/or closed or open cell foams. In one embodiment, the sealing element has a durometer reading in the range between about 35 Shore A and about 50 Shore D. In specific one arrangement, the sealing element has a durometer reading of less than 50 Shore A. When softer materials form the sealing element, it may be desirable to encase the soft sealing element in a more durable outer coating. For instance, encasing a soft rubber seal in a thin plastic shell may improve the wear characteristics of the sealing element without altering its function. The casing may also improve the non-permeability of the sealing element thereby allowing use of preamble materials to form the sealing element.

Figure 5A:
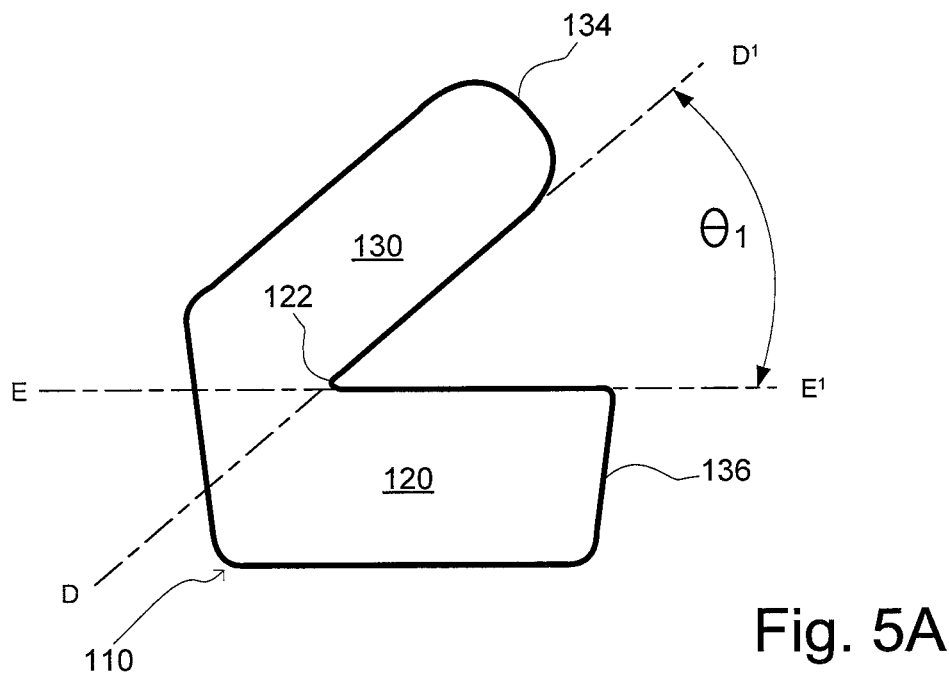
FIGS. 5A and 5B illustrate an enlarged cross-sectional view of one embodiment of the sealing element in an uncompressed condition and a compressed condition, respectively.
Figure 5B:
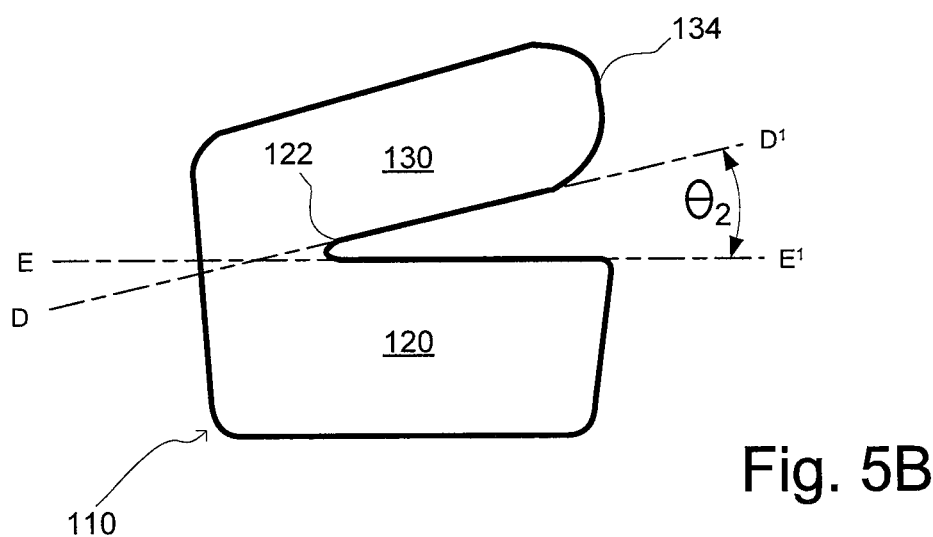

As illustrated in the cross-sectional views A-A', B-B', C-C' of FIG. 4 and FIG. 5A, the sealing element is generally defined by two separate portions, a base portion 120 and a flap portion 130. The base portion 120 and flap portion 130 are interconnected at a vertex 122. Generally, the flap portion defines an elongate body member that extends between a first end of the flap located at the vertex connecting the base portion and flap portion and a second free end 134 of the flap 130. In this regard, the elongate body of the flap 130 generally defines a first reference axis D-D' while the base portion 120 generally defines a second reference axis E-E' between the vertex 122 and its second free end 134. As shown, the first reference axis D-D' and second reference axis E-E' of the flap portion 130 and base portion 120, respectively, are disposed at a first angle $\theta_1$ relative to one another prior to compression. In use, the flap portion 130 is designed to be compressed toward the base portion 120 as illustrated in FIG. 5B. When compressed/deflected, the angle between the first reference axis first reference axis D-D' and second reference axis E-E' forms a second angle $\theta_2$ that is smaller than the first angle $\theta_1$.

The base portion 120 is adapted for fixed interconnection to an engagement surface of one of the carrier shells. For instance, a lower surface of the base portion 120 may be adhered about the periphery of an engagement surface. In such an arrangement, the adhesive interconnecting the base portion 120 the engagement surface may provide a fluid tight interface there between. In another arrangement, in addition to being adhered to the engagement surface, the engagement surface may utilize a recessed groove that receives the base portion 120 of the sealing element 110.

Figure 6A:
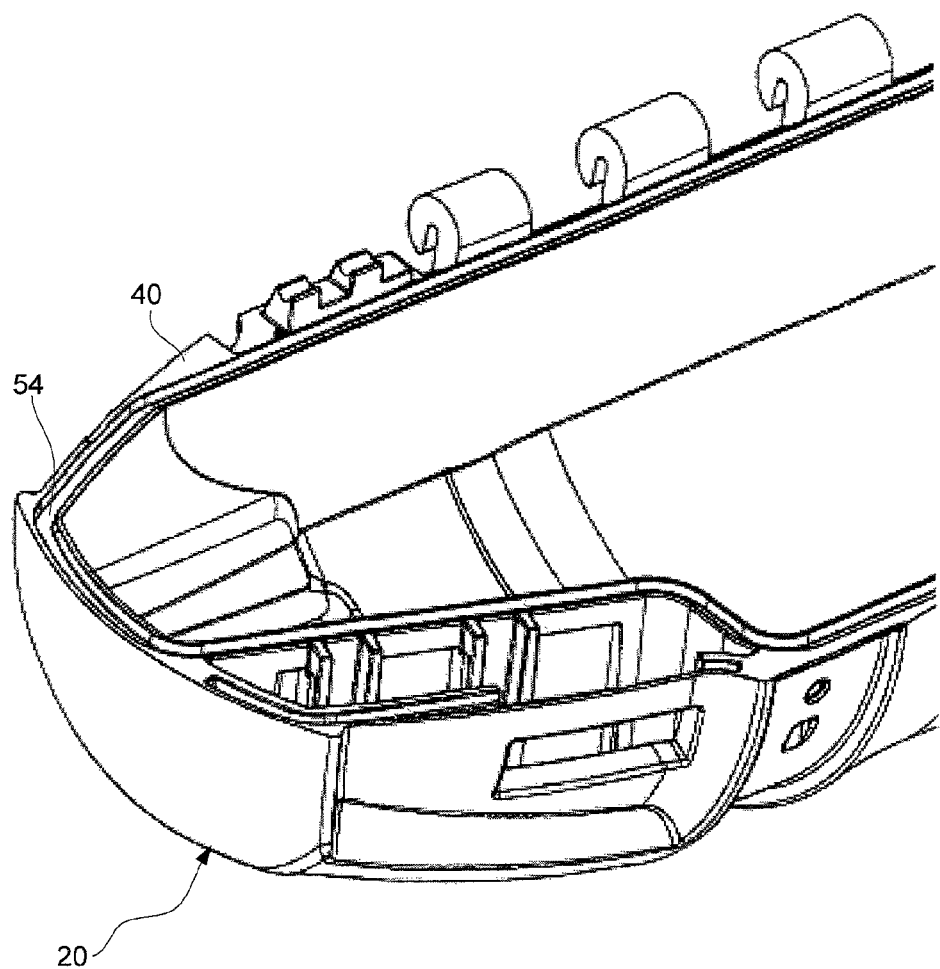
FIG. 6A illustrates a carrier shell having an engagement surface with a recessed groove fro receiving a portion of a sealing element.

FIG. 6A illustrates a close-up view of a portion of a first carrier shell 20 that is adapted to receive the sealing element 110 on its engagement surface 40. In this embodiment, the engagement surface 40 further includes a recess or groove 54 that extends around the periphery of the engagement surface 40. The groove is sized to conformably receive the base portion 120 of the sealing element 110 therein as illustrated in cross-section in FIG. 7A. In the present embodiment, a top surface of the base portion 120 is substantially level with the top surface of the engagement surface 40. That is, the second reference axis E-E' is substantially aligned with the plane defined by the top surface of the engagement surface 40.

Figure 7A:
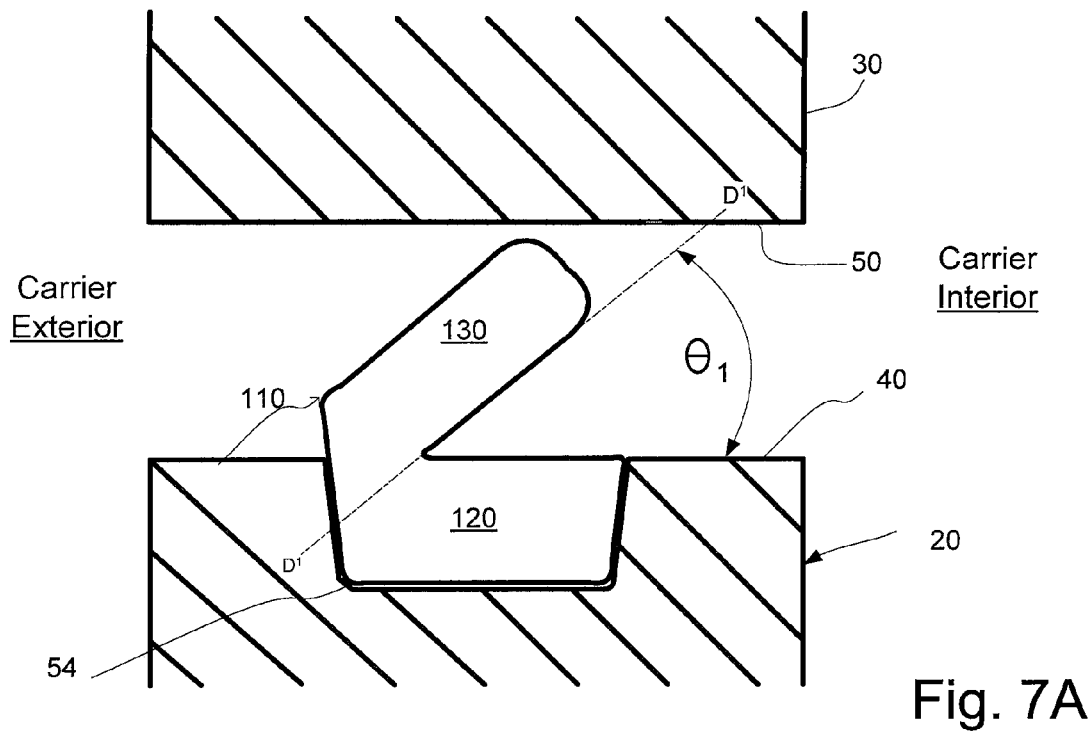
FIGS. 7A and 7B illustrate the sealing elements of FIGS. 5A and 5B, respectively, as disposed on engagement surfaces of carrier shells where one of the carrier shells includes a groove for receiving a portion of the seal element.
Figure 7B:
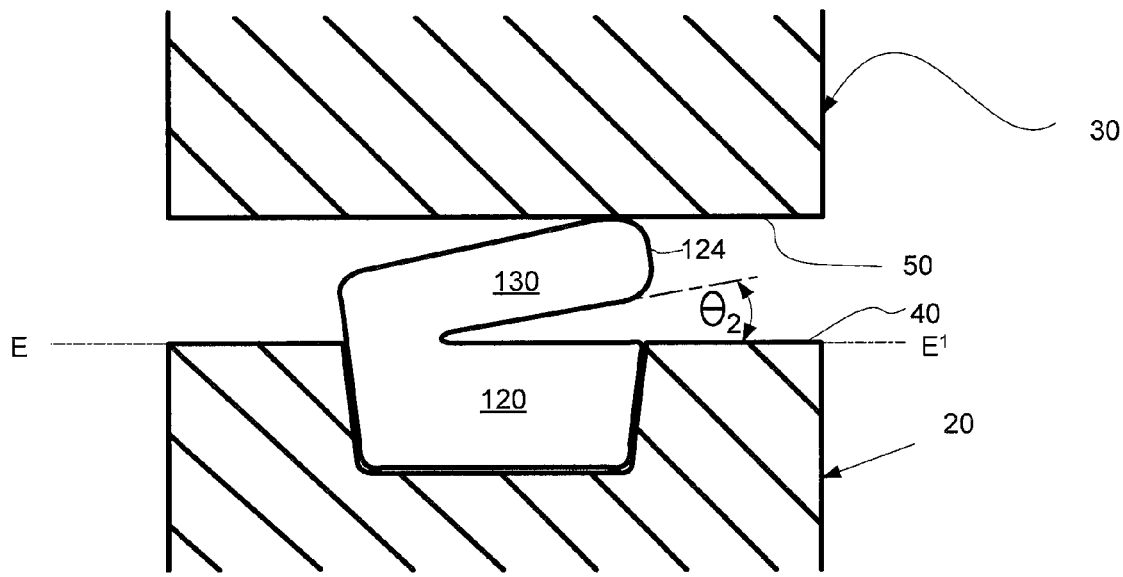

As illustrated in FIG. 7A, prior to the first and second carrier shells closing the deflectable flap portion 130 is disposed at the first angle $\theta_1$ relative to the base portion 120 and hence the plane defined by the first engagement surface 40. As a carrier shells close, as illustrated in FIG. 7B, the second engagement surface 50 of the second carrier shell 30 engages the flap member near and second freehand 124. This compresses the flap portion 120 toward the base portion 120 and toward the second engagement surface 40 resulting in a smaller angle $\theta_2$ between the reference axis D-D' of the flap portion 130 and reference axis E-E' of the base portion 120. Stated otherwise, when the carrier closes, the second engagement surface 50 compresses the flap portion 130 from a first orientation relative to the first engagement surface 40 a second different orientation angle relative to the first engagement surface 40.

Figure 6B:
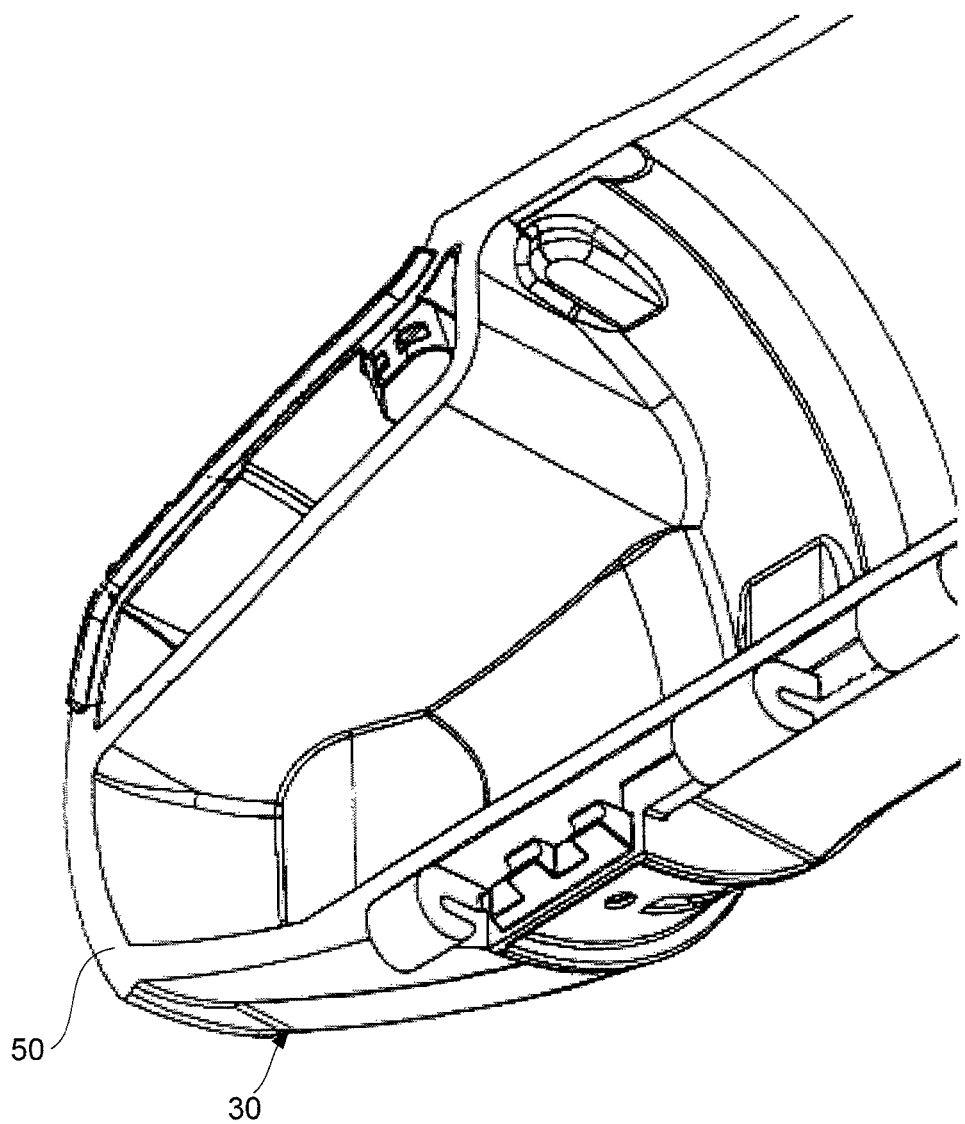
FIG. 6B illustrates a carrier shell having an substantially planar engagement surface.

As illustrated in FIGS. 6B, 7A and 7B, the second engagement surface 50 is a substantially planar surface. That is, except for any manufacturing tolerances this second engagement surface 50 may be generally flat. Further, the second engagement surface 50 is typically of a sufficient width to account for any offsets between the first and second carrier shells 20, 30 once they are connected. In this regard, offsets between the carrier shells 20, 30 do not affect the ability of the sealing element 110 to create a seal between the engagement surfaces 40, 50. Likewise, as the flap potion 130 extends above the reference plane defined by the first engagement surface 40 in a non-deformed state (e.g., FIGS. 5A and 7A) and deflects around the periphery of the engagement surfaces in response to contact by the second engagement surface 50, the flap may conform to irregularities in the distance between the mating engagement surfaces 40, 50 about their peripheries. That is, even if the engagement surfaces are not perfectly planar, the cantilevering of the flap portion 130 of the sealing element above the first engagement surface 40 allows for the flap portion to account for such variations at different locations around the engagement surface peripheries. As will be appreciated this may result in the flap portion 130 be compressed at differing second angles $\theta_2$ around the periphery of the engagement surfaces, when the carrier shells 20, 30 are in a closed position.

The sealing element 110 provides a further benefit for producing a fluid tight seal between first and second carrier shells 20, 30. Specifically, the cantilevered arrangement of the flap portion 130 allows for using fluid pressure within the interior of the carrier to maintain the flap portion 130 in contact with the second engagement surface 50. That is, in a situation where a fluid exists within an interior of the carrier and the second free end 134 of the seal element 110 extends towards the interior of the carrier (i.e., toward the interior of the periphery of the engagement surface 40), such fluid will apply an outward pressure to the flap portion 130 thereby pushing the flat portion 130 into further contact with the second engagement surface 50.

Figure 8A:
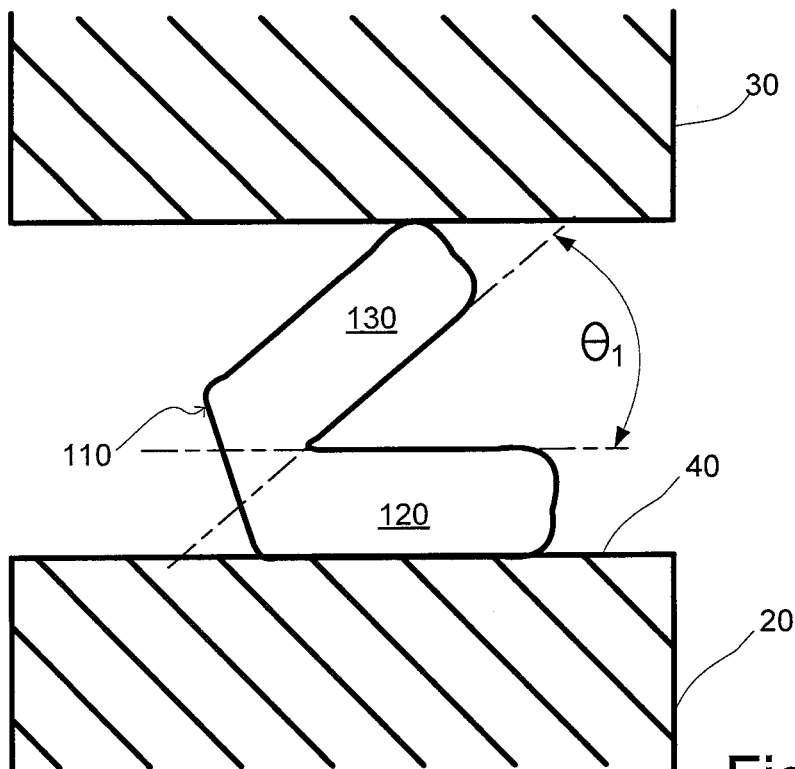
FIGS. 8A and 8B illustrate the sealing elements of FIGS. 5A and 5B, respectively, as disposed on engagement surfaces of carrier shells where both carrier shells include substantially planar engagement surfaces.
Figure 8B:
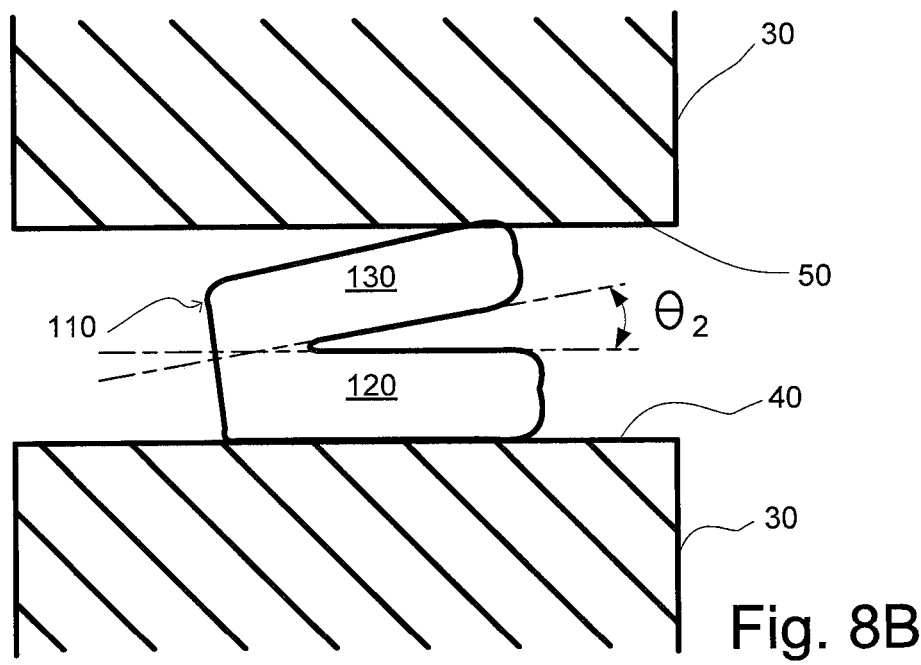

Variations of the noted sealing element and carrier incorporating the same are possible and within the scope of the presented inventions. For instance, rather than utilizing a first engagement surface having a groove that is sized to receive the base portion 120 of the sealing element 110, the base portion 120 may be attached directly the first engagement surface. Such an embodiment is illustrated in FIGS. 8A and 8B. As shown, in this embodiment the base portion 120 is adhered directly to a planar surface defined by the second engagement surface 40. In this regard, the first engagement surface 40 of the first carrier shell 20 may be formed substantially identically to the base surface 50 of the second carrier shell 30. See for instance FIG. 6B. In such an arrangement, a single die may be utilized to form both the first and second shells.

Figure 9A:
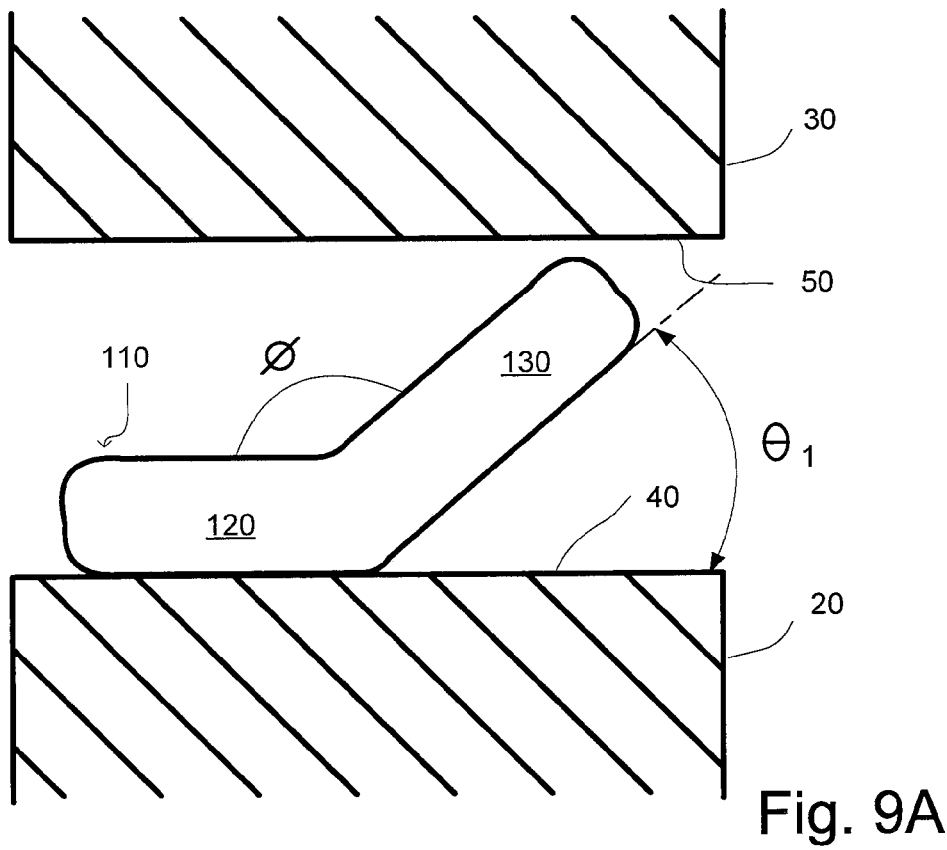
FIGS. 9A and 9B illustrate another embodiment of a sealing element as disposed on engagement surfaces of carrier shells.
Figure 9B:
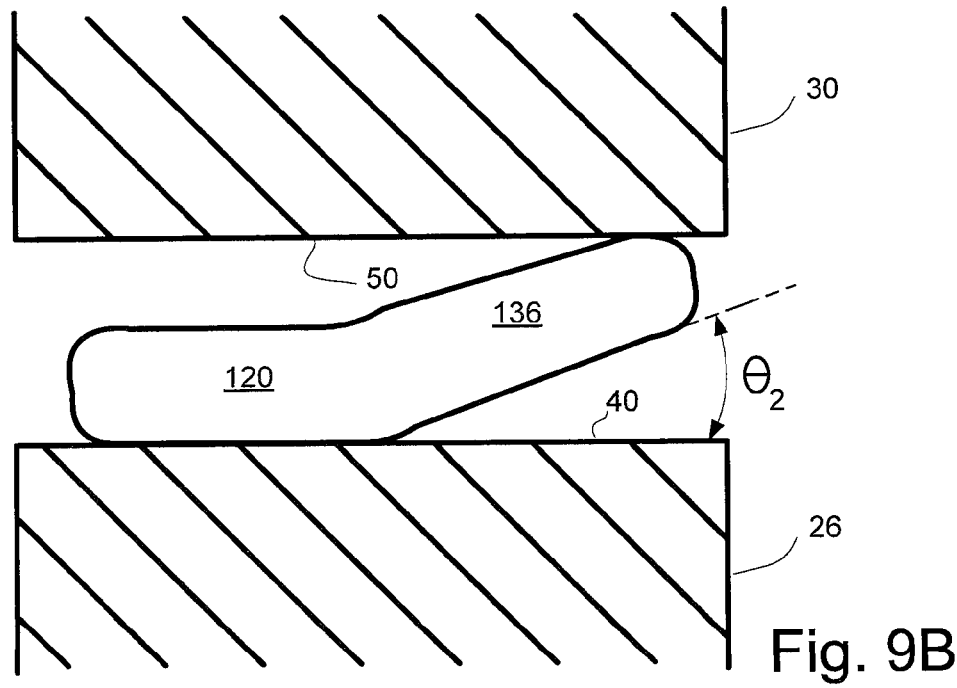

In the embodiments of FIGS. 7A, 7B, 8A and 8B, the base portion 120 and flap portion 130 of the sealing element 110 are connected to one another in a manner that forms an acute included angle between the reference axes of these portions. However, it will be appreciated that other configurations are possible. For instance, as shown in FIGS. 9A and 9B, the base portion 120 and flap portion 130 may be configured such that an included angle $\phi$ between these portions is an obtuse angle. What is important is that the flap portion extends above the base portion such that, rather than compressing the entire body of sealing element, the second engagement surface 50 may contact the cantilevered flap that extends above the surface of the first engagement surface 40 and compress the flap toward the first engagement surface.

FIGS. 1, 2, 10A-10C illustrate one non-limiting embodiment of a latching mechanism. As illustrated, these latching or connecting mechanisms comprise a pair of latch assemblies 90a, 90b that releasably attach the first and second shell member in the closed position. Each of the latch assemblies 90a, 90b (hereafter 90) includes a latch pawl 126 having a hooked tip. The latch assemblies also have an internal bias force member (e.g., spring coil, leaf spring, etc.) that permits linear movement of the pawl member 126 between a first position and a second position (e.g., an extended position and a retracted position). The latch pawl 126 and bias force member are connected to one of the shell members such that the hooked tip 130 may engage a detent on the other shell.

Figure 10C:
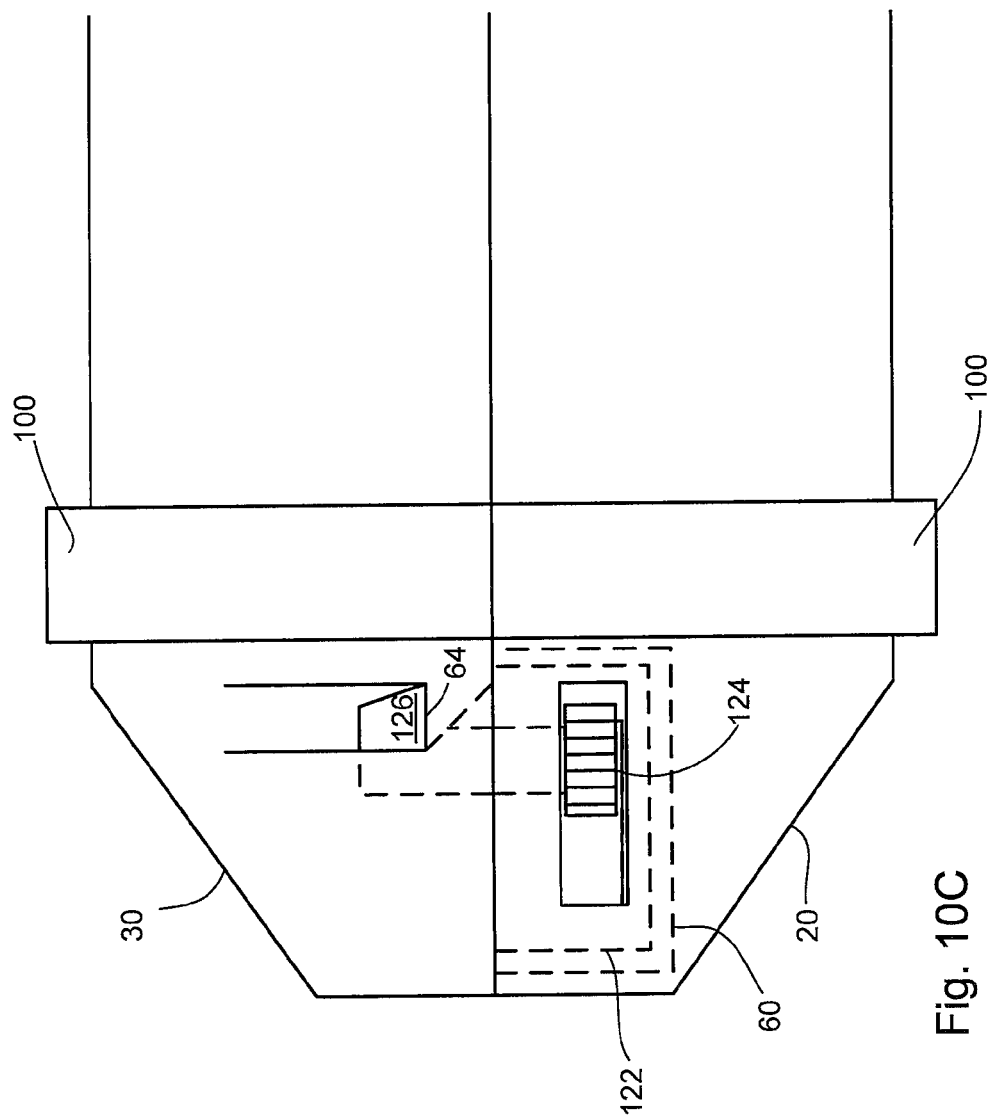

The latch assemblies 90 are disposed within a receiving recess or pocket 60 formed in the front corner of the shell members 20, 30. As noted above, each latch assembly 90 is disposed outside of the periphery of the engagement surface 40 or 50 such that the latch assembly is outside the sealed cargo area formed by the engagement surfaces 40, 50 when the shells are closed. As shown, each latch assembly 90 includes a base member 122 that is disposed within the pocket 60 formed in the respective shell member. This base member 122 supports the latch pawl 126 as well as the bias force member. Once inserted within the pocket 60, a latch handle 124 is interconnected to the pawl 126. More specifically, the latch handle is disposed through an aperture formed in the housing wall 26. In the present embodiment, the latch handle may be secured to the pawl 126 utilizing a screw or other fastening means. Once so interconnected, the latch handle prevents the latch mechanism 90 from being removed from the pocket 60. As illustrated in FIGS. 10A-10C, the elongated aperture through the sidewall allows the latch handle to move forward and backward between an extended position (e.g., FIG. 10A) and retracted position (e.g., FIG. 10B). Likewise, movement of the latch handle allows for compressing the bias force member, thereby retracting the pawl 126.

The shell member opposing the latch assembly 90 includes a detent 64 that is adapted to receive the hooked end of the pawl 126. Specifically, as shown in FIG. 10A, a top surface 128 of the pawl 126 is slanted and is adapted to engage a ramped surface 66 within the shell member 30 including the detent 66. When the first and second shell members are closed, the pawl 126 engages the ramped surface 66 of the detent 64, thereby compressing the bias force member and allowing the pawl 126 to automatically retract (See FIG. 10B). When the first and second shells close (See FIG. 10C), the hooked end of the pawl 126 falls over the top edge of the ramp 66 into the detent 64. This secures the first and second shells in the closed position. Accordingly, a user may open the shells by grasping the latch handles (e.g., with both thumbs on the first and second latching assemblies 90a, 90b) and retracting the pawls from the detents Importantly, the relationship between the pawl 126 and the detent 64 is such that when the pawl 126 is engaged with the detent the sealing element 110 is energized. That is, the latch assembly 132 is a single stage latch where simply closing the shell members engages the latch and provides sufficient energizing force to form a seal between the first and second engagement surfaces. That is, a user is not required to provide additional compressive force after closing the first and second shells to energize the seal. Such a latch may be referred to as a single stage latch or a slam latch. Use of such a single stage latch provides a further benefit. Specifically, if the carrier is launched though a pneumatic tube prior to the latches being properly engaged, the compression applied to the shells of the carrier by the pneumatic tube (e.g., via the wear bands) will tend to complete the engagement of the latches. Furthermore, due to use of deflectable flap 130 of the sealing element 110, in contrast to, for example, flat contact between two planar surfaces having a generally flat sealing gasket disposed there between, less force is required to engage the two shell members 20, 30 or open the carrier 10. This facilitates the opening and closing of the carrier 10.

The foregoing description of the present invention has been presented for purposes of illustration and description. Furthermore, the description is not intended to limit the inventions to the forms disclosed herein. Consequently, variations and modifications commensurate with the above teachings, and within the skill and knowledge of the relevant art, are part of the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

The invention claimed is:

1. A pneumatic carrier for use in a pneumatic tube transport system, comprising:
    first and second shells having first and second engagement surfaces, respectively, wherein a first periphery of said first engagement surface and a second periphery of said second engagement surface are juxtaposed in a closed position;
    a hinge member coupled to said first and second shells and permitting movement between the closed position and an open position;
    a seal element disposed about said first periphery of said first engagement surface, wherein a cross-sectional profile of said seal includes:
        a base portion fixedly attached relative to said first engagement surface; and
        a deflectable flap portion having an elongate body extending away from said base portion above a plane of said first engagement surface, wherein in said closed position said second engagement surface contacts said deflectable flap portion and compresses said elongate body of said deflectable flap portion toward said first engagement surface; and
    a latch having:
        a biased pawl attached to one of the first and second shells;
        a ramped surface attached to the other of said first and second shells; and
        a detent formed at the end of said ramped surface, wherein said ramped surface engages said pawl as said shells move from the open position to the closed position and wherein said detent receives said pawl in the closed position to secure said shells in the closed position.

2. The pneumatic carrier of claim 1, wherein said elongate body of said deflectable flap portion defines a reference axis, wherein in said open position said elongate body is disposed at a first angle as measured between said reference axis and said plane of said first engagement surface and in said closed position said elongate body is disposed at a second angle as measured between said reference axis and said plane of said first engagement surface, wherein said second angle is less than said first angle.

3. The pneumatic carrier of claim 2, wherein said first angle is less than 70 degrees.

4. The pneumatic carrier of claim 1, wherein said elongate body of said deflectable flap portion extends away from said base portion in a direction toward an interior of said first periphery of said first engagement surface.

5. The pneumatic carrier of claim 1, wherein said first engagement surface is disposed in a single plane about said first periphery.

6. The pneumatic carrier of claim 1, wherein said first engagement surface further comprises a groove about said first periphery, wherein said base portion of said seal element is at least partially disposed within said groove.

7. The pneumatic carrier of claim 1, wherein said second engagement surface is disposed in a single plane about said second periphery.

8. The pneumatic carrier of claim 1, wherein the seal element has a Shore A durometer hardness of less than 50.

9. The pneumatic carrier of claim 1, wherein said latch is disposed outside of said first and second peripheries of the said first and second engagement surfaces.

10. A pneumatic carrier for use in a pneumatic tube transport system, comprising:
- a first shell having a first engagement surface including a groove extending about a first periphery thereof;
- a second shell having a substantially planar second engagement surface extending about a second periphery thereof;
- a hinge member coupled to said first shell and said second shell and permitting movement between an open position and a closed position where said first and second engagement surfaces are juxtaposed;
- a seal element having:
  - a base portion, at least partially disposed within said groove about said first periphery of said first engagement surface; and
  - a flap having an elongate body, in cross-sectional profile, extending from a first end attached to said base portion about said first periphery of said first engagement surface to a second free end, wherein said elongate body extends above a plane of said first engagement surface and said second free end is disposed toward an interior of the periphery of said first engagement surface, and
- a latch having:
- a biased pawl attached to one of said first and second shells;
- a ramped surface attached to the other of said first and second shells; and
- a detent formed at the end of said ramped surface, wherein said ramped surface engages said pawl as said shells move from the open position to the closed position and wherein said detent receives said pawl in the closed position to secure said shells in the closed position.

11. The pneumatic carrier of claim 10, wherein in said closed position said second engagement surface contacts said flap and compresses said flap toward said first engagement surface.

12. The pneumatic carrier of claim 10, wherein in said open position said elongate body of the flap is disposed at a first angle measured between a reference axis defined by said elongate body and said plane of said first engagement surface and in said closed position said elongate body is disposed at a second angle measured between said reference axis and said plane of said first engagement surface, wherein said second angle is less than said first angle.

13. The pneumatic carrier of claim 12, wherein said first angle is less than 70 degrees.

14. The pneumatic carrier of claim 10, wherein said seal element has a Shore A durometer hardness of less than 50.

15. The pneumatic carrier of claim 10, wherein said biased pawl member comprises:
- a sliding element; and
- a spring, wherein said sliding element compresses said spring when said sliding element moves from a first position to a second position.

16. The pneumatic carrier of claim 10, wherein said latch is disposed outside of said first and second peripheries of said first and second engagement surfaces.

17. A pneumatic carrier for use in a pneumatic tube transport system, comprising:
- first and second shells having first and second engagement surfaces, respectively, wherein a first periphery of said first engagement surface and a second periphery of said second engagement surface are juxtaposed in a closed position;
- a hinge member coupled to said first and second shells and permitting movement between the closed position and an open position;
- a seal element disposed about said first periphery of said first engagement surface, wherein a cross-sectional profile of said seal includes:
  - a base portion fixedly attached relative to said first engagement surface; and
  - a deflectable flap portion having an elongate body defining a reference axis, wherein in said open position said elongate body extends away from said base portion and is disposed at a first angle of less than 70 degrees, as measured between said reference axis and a plane of said first engagement surface, and in said closed position said second engagement surface contracts and compresses said elongate body to a second angle as measured between said reference axis and said plane of said first engagement surface, wherein said second angle is less than said first angle; and
- a latch having
  - a first portion attached to one of the first and second shells, wherein said latch is operative to engage the other of the first and second shells to secure said shells in the closed position.

* * * * *